United States Patent Office 3,551,577
Patented Dec. 29, 1970

3,551,577
1-(4-NITROPHENYL)-1-(4′-NITROPHENYL)-2,2-DIHALOCYCLOPROPANE INSECTICIDES
George Holan, Brighton, Victoria, Australia, assignor to Monsanto Company (Australia) Limited, West Footscray, Victoria, Australia, a company of Victoria
No Drawing. Original application Dec. 11, 1967, Ser. No. 689,317, now Patent No. 3,481,993, dated Sept. 13, 1969. Divided and this application Jan. 30, 1969, Ser. No. 810,071
Int. Cl. A01n 9/20
U.S. Cl. 424—349        2 Claims

ABSTRACT OF THE DISCLOSURE

Compounds of the formula

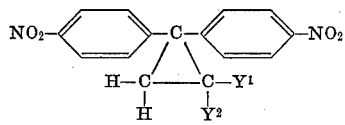

wherein $Y^1$ is selected from the group consisting of chlorine, bromine and fluorine and $Y^2$ is selected from the group consisting of chlorine and bromine provided that when $Y^1$ is fluorine $Y^2$ is chlorine, are useful in combating insects.

---

This application is a division of copending application Ser. No. 689,317, filed Dec. 11, 1967 now U.S. Pat. No. 3,481,993.

This invention provides certain new 1-(4-nitrophenyl)-1-(4′-nitrophenyl)-2,2-dihalocyclopropanes, which possess properties useful for combating insect pests. The invention also provides methods for the preparation of said new compounds; the method of combating insect pests by utilizing said new compounds; and, insecticidal formulations embodying said new compounds.

The new 1-(4-nitrophenyl)-1-(4′-nitrophenyl)-2,2-dihalocyclopropanes of this invention have the formula:

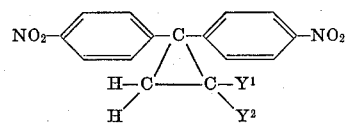
(I)

wherein $Y^1$ is selected from the group consisting of chlorine, bromine and fluorine and $Y^2$ is selected from the group consisting of chlorine and bromine, provided that when $Y^1$ is fluorine $Y^2$ is chlorine. Thus, the compounds of the above formula which are useful in the compositions and methods of this invention are:

1-(4-nitrophenyl)-1-(4′-nitrophenyl)-2,2-dichlorocyclopropane
1-(4-nitrophenyl)-1-(4′-nitrophenyl)-2,2-dibromocyclopropane
1-(4-nitrophenyl)-1-(4′-nitrophenyl)-2,2-chlorobromocyclopropane
1-(4-nitrophenyl)-1-(4′-nitrophenyl)-2,2-chlorofluorocyclopropane The new compounds of the invention can be prepared by the nitration of the appropriate 1,1-diphenyl-2,2-dihalo cyclopropane, as illustrated by the following equation:

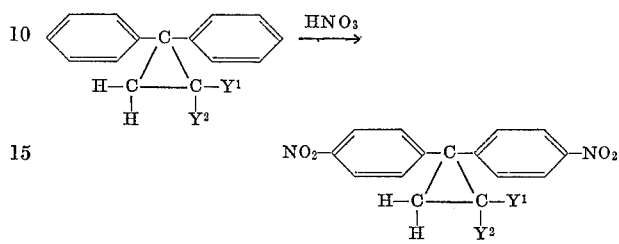

wherein $Y^1$ and $Y^2$ are as defined above, it having been found that nitrosubstitution occurs virtually exclusively in the 4-position of each phenyl ring, since other isomers were undetected. The usual procedure for nitration apply except that fuming nitric acid (specific gravity about 1.5, concentration about 98%) is required for a desirable reaction rate. It is preferred to use a mixture of acetic anhydride and acetic acid as reaction medium. The material to be nitrated preferably is added slowly to the nitration mixture (nitric acid plus acetic acid/acetic anhydride) and the exothermic reaction is controlled by cooling. Preferably, the reaction is maintained at room temperature or below, the best conditions being about $-5$ to $+10°$ C. Time of reaction is governed by the ability to cool the reaction. After addition is complete, the mixture should be stirred for a suitable minimum period, say 15 to 30 mins. The desired compound is isolated by quenching the reaction mixture into water or ice and filtering, the end product being purified if necessary by recrystallization.

The following non-limitative example illustrates the preparation of the new compounds of the invention:

EXAMPLE 1

Fuming nitric acid (S.G. 1.5; 13 ml.) was added dropwise to a mixture of glacial acetic acid (12 ml.) and acetic anhydride (20 ml.), keeping the temperature below $10°$ C. To this was added in small portions 1,1-diphenyl-2,2-dichloro cyclopropane (11.2 g.) with stirring and cooling. The addition took 1 hour, the temperature of the reaction mixture being maintained between $-5$ and $+5°$ C. It was stirred for 15 minutes and quenched into 200 ml. of iced water. The product, 1,1-bis(p-nitrophenyl)-2,2-dichlorocyclopropane, was separated by filtration, washed with diluted nitric acid, and recrystallized from ethanol. Yield of product, M.P. $184°$ C. was 90%.

1,1-diphenyl-2,2-dihalo cyclopropane starting materials employed above can be obtained by a number of methods involving reaction of an appropriate 1,1-di-phenyl ethylene having the structural formula:

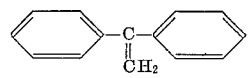

with a medium which generates an appropriate dihalocarbene or which contains an appropriate dihalomethylene transfer agent. Thus, the 1,1-diphenylethylene can be reacted with a suitable phenyl(trihalomethyl)-mercury, such as phenyl(trichloromethyl)mercury or phenyl (bromodichloromethyl)mercury or phenyl(tribromomethyl)mercury or phenyl(dibromochloromethyl)mercury. The two reaction components can be mixed in any manner in an aprotic solvent and heated. Preferably, benzene is used as the solvent but other solvents such as chlorobenzene, dimethyloxyethane, sulpholane, dimethylformamide, and the like, may be used. The temperature varies with the solvent, which should preferably boil above 50° C. The reaction is continued until substantially complete, this being usually about two hours, but longer periods are not deleterious. Phenylmercuric chloride or bromide is obtained as by-product, and can be removed by filtration. The desired end product may be isolated by conventional means such as evaporation and filtration. Yields of almost 100% can be obtained.

An illustrative practical example for the preparation of 1,1-diphenyl-2,2-dichlorocyclopropane by the method indicated above is as follows:

EXAMPLE 2

1,1-diphenyl ethylene (18 g.) was refluxed with a solution of phenyl(trichloromethyl)mercury (40 g.) in chlorobenzene 700 ml. for 4 hours. The mixture was cooled and the precipitated phenylmercuric chloride was filtered off. The solvent was distilled from the filtrate and the residual product was recrystallized from petroleum ether to give a 96% yield of crystals melting at 114° C.

An alternative procedure for the preparation of the 1,1-diphenyl-2,2-dihalocyclopropane starting materials involves reaction of the appropriate 1,1-diphenylethylene with a haloform and a base. The haloform may be chloroform or bromoform or bromodichloromethane or dibromochloromethane or dichlorofluoromethane, while the base preferably is potassium tert-butoxide, however, other bases such as butyl lithium, methyl lithium, and sodium hydroxide pellets may be used. Other alternative procedures involving systems which generate dihalocarbene which can be used are the reaction of ethyl trichloroacetate and sodium methoxide; or the decarboxylation of sodium trichloroacetate; or the reaction of hexachloroacetone and a base, in each case the appropriate 1,1-diphenylethylene being included in the reaction system.

Appropriate 1,1-di-(p-substituted phenyl)ethylene starting materials can be prepared by known methods such as from p-substituted phenyl magnesium bromide and ethyl acetate; or from methyl magnesium iodide and 4,4'-disubstituted benzophenone followed by dehydration; or from substituted acetophenone, as noted in Organic Syntheses Collective Volumes I, pp. 221–222, 1932 edition.

Compounds of Formula I, hereinafter referred to as "active compounds," in accordance with the invention are useful in the combatting of insect pests, particularly DDT-resistant insect pests such as DDT-resistant mosquitoes and flies and their larvae, as well as in the combatting of other insect pests in general, such as Southern Army worm, as hereinafter indicated. It is surmised that an inability of insect life to effect dehydrochlorination of the above specified active compounds is responsible for the unique activity of the active compounds against insect pests which have become DDT-resistant. Besides possessing the unique insecticidal activity indicated, it has been established that the active compounds also have a very low level of toxicity towards animals and a wide range of economic plants.

In combatting insect pests according to the invention, any of the active compounds either per se or insecticidal compositions comprising one or more of said active compounds are applied to the insect pests or to their environment in a lethal or toxic amount. This can be done by distributing the active compounds or an insecticidal composition comprising them in or about an infested environment or in or about an environment which the insect pests frequent, e.g. agricultural soil or other growth media or other media attractable to the pests for habitational or sustenance or propagational purposes, in any conventional fashion which permits the insect pests to be subject to the insecticidal action of the active compounds. Such distribution can be brought about by applying sprays or particulate solid compositions to a surface infested with the insect pests or attractable to the pests, as for example, the surface of an agricultural soil or other habitat media such as the above-ground surface of host plants by any of the conventional methods, e.g. power dusters, boom and hand sprayers, and spray dusters. Also for sub-surface application such distribution can be carried out by simply mixing the active compounds per se or insecticidal spray or particulate solid composition comprising same with the infested environment or with the environment the insect pests frequent, or by employing a liquid carrier for the active compounds to accomplish sub-surface penetration and impregnation therein.

Thus, although the active compounds are useful per se in combatting insect pests, it is preferable in practising the method of the present invention, that the active compounds be applied to the pests or to the environment of the pests in a dispersed form in a suitable extending agent. In this specification the term "dispersed" is used in its widest possible sense, thus, the term means that particles of the active compounds may be molecular in size and held in true solution in a suitable organic solvent; the term also means that the particles may be colloidal in size and distributed throughout a liquid phase in the form of suspensions or emulsions or in the form of particles held in suspension by surface-active agents of a non-ionizing character; the term also means that the particles can be distributed in a semi-solid viscous carrier such as petroleum or other ointment base of a non-ionizing character in which they may be actually dissolved in the semi-solid or held in suspension in the semi-solid with the aid of suitable non-ionizing surface-active agents; the term also means that the particles may be mixed with and distributed throughout a solid carrier providing a mixture in particulate form, e.g. pellets, granules, powders, or dusts; and the term also means that the particles can be in mixtures which are suitable for use as aerosols including solutions, suspensions, or emulsions of the active compounds in a carrier such as dichlorodifluoromethane and like fluorochloroalkanes or mixtures of these and/or with other substances which boil below room temperature at atmospheric pressure. In this specification and appended claims, the expression "extending agent" includes any and all of those substances in which the active compounds are dispersed, including, therefore, the solvents of a true solution, the liquid phase of suspensions, emulsions or aerosols, the semi-solid carrier of ointments, and the solid phase of particulate solids, e.g. pellets, granules, dusts and powders.

The concentration of the active compounds employed according to the invention in combatting insect pests can vary considerably provided the required dosage (i.e. toxic or lethal amount) thereof is supplied to the pests or to the environment of the pests. When the extending agent is a liquid or mixture of liquids as in solutions, suspensions, emulsions, or aerosols, the concentration of the active compound employed to supply the desired dosage generally will be in the range of 0.001 to 50 percent by weight. When the extending agent is a semi-solid or solid, the concentration of the active compounds employed to supply the desired dosage generally will be in the range of 0.01 to 25 percent by weight.

There are a large number of organic liquids which can be used for the preparation of solutions, suspensions or emulsions of the active compounds. For example, isopropyl ether, acetone, methyl ethyl ketone, octanone, dioxane, cyclohexanone, carbon tetrachloride, ethylene dichloride, tetrachloroethane, hexane, heptane, and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent, a portion of same can be replaced by such low molecular weight aliphatic hydrocarbons as dipentene, diisobutylene, propylene trimer, and the liker or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When the active compounds are to be supplied to the insect pests or to the environment of the pests as aerosols, it is convenient to dissolve said compounds in a suitable solvent and disperse the resulting solution in dichlorodifluoromethane or like chlorofluoroalkane or mixtures of these or with other aerosol dispersants which boil below room temperature at atmospheric pressure. In this connection the invention provides as a new article of manufacture, suitable for combatting flying insects, particularly DDT-resistant mosquitoes, in and around the household, an aerosol pressure-pack comprising a pressurized container enclosing an aerosol composition embodying said active compounds.

The active compounds are preferably applied to the insect pests or to the environment of the insect pests in the form of emulsions or suspensions. Emulsions or suspensions are prepared by dispersing the said active compounds either per se or in the form of an organic solution thereof in water with the aid of a water-soluble non-ionic surfactant. The term "surfactant" as employed in this specification is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the said active compounds in order to secure better wetting and spreading of the active compounds in the water vehicle or carrier in which the said active compounds are insoluble through lowering the surface tension of the water (see also Frear "Chemistry of Insecticides, Fungicides and Herbicides," second edition, page 280). The surfactants contemplated are the well-known capillary active substances which are non-ionizing (or non-ionic) and which are described in detail in Volumes I and II and Schwartz, Perry and Berch's "Surface Active Agents and Detergents" (1958, Interscience Publishers, Inc., New York), and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water-soluble non-ionic surface-active agents set forth in U.S. Pat. No. 2,846,398.

The active compounds can be dispersed by suitable procedures (e.g. tumbling or grinding) in solid extending agents either of organic or inorganic nature and applied to the insect pests environment in particulate form. Such solid materials include for example, tricalcium phosphate, calcium carbonate, kaolin, bole, kieselguhr, talc, bentonite, charcoal, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble non-ionic surfactants the dry particulate solids can be rendered wettable by water so as to obtain stable aqueous dispersions or suspensions suitable for use as sprays. For special purposes the active compounds can be dispersed in a semi-solid extending agent such as petrolatum with or without the aid of solubility promotors and/or non-ionic surfactants.

A concentrate, for example in the form of a spray base or particulate solid base may be provided in such form that, by merely mixing with water or with a solid extender (e.g. powdered clay or talc) or other low-cost readily-available material, an easily prepared spray or particulate solid insecticide for household or agricultural purpose can be produced. In such a concentrate composition, the above active compounds generally will be present in a concentration of 5 to 95 percent by weight, the residue being any one or more of the well-known insecticidal adjuvants, such as the surface-active clays, solvents, diluents, carrier media, adhesives, spreading agents, humectants, and the like.

A particularly useful concentrate ready for mixing with or dispersing in other extending agents is an intimate mixture of the active compounds with a wetting and dispersing agent in a proportion of 0.1 to 20 parts of surfactant with sufficient of the active compounds to make 100 parts by weight. Such a concentrate is particularly adapted to be made into a spray for combatting various forms of insect pests by the addition of water thereto. As illustrative of such a concentrate is an intimate mixture of 20 parts by weight of 1-(4-nitrophenyl)-1-(4'-nitrophenyl)-2,2-dichlorocyclopropane and 5 parts by weight of a wetting and dispersing agent. Another useful concentrate adapted to be made into a spray for combatting insect pests is a solution (preferably as concentrated as possible) of the active compounds in an organic solvent containing a minor amount (e.g. 0.5 to 15 percent by weight of the weight of the active compounds) of an emulsifying agent. As illustrative of such a concentrate is a solution of 1-(4-nitrophenyl)-1-(4'-nitrophenyl)-2,2-dichlorocyclopropane in solvent naphtha, xylene or a petroleum fraction such as kerosene, containing an emulsifying agent.

In all of the various dispersions described hereinbefore for insecticidal purposes, the said active compounds can be advantageously employed in combination with other pesticides, including for example, other insecticides, nematocides, bactericides, and herbicides. In this manner it is possible to obtain mixtures which are effective against a wide variety of pests and other forms of noxious life.

Insecticidal activity of the new compounds of Formula I above was demonstrated in tests against mosquito larvae specie *Aedes aegypti*, of the family Culicidae of the order Diptera, as follows:

*Aedes aegypti.* A rimless, 25 x 200 culture tube was rinsed with acetone and was placed in a holding block. The tube was filled with 70 cc. of distilled water, and 0.1 cc. of liquid or 0.1 g. of the solid test compound was dissolved in acetone to make a 1% by weight concentrate of the test chemical, 0.007 ml. of this concentrate was pipetted into the culture tube containing the distilled water. The tube was then stoppered with an acetone washed rubber stopper and shaken to facilitate complete mixing. Approximately 25 early fourth instar yellow fever mosquito larvae *Aedes aegypti* were transferred to the tube with the aid of a pipette. The larvae were held in the test tube at room temperature for 24 hours at which time mortality observations were taken. Any larvae capable of any movement was considered to be alive. Under test 1,1 - dichloro - 2,2-bis-(p-nitrophenyl)-cyclopropane gave 100% kill at a concentration as low as 0.2 p.p.m.

While the invention has been described in considerable detail with reference to specific embodiments thereof, other modifications and variations will suggest themselves to those skilled in the art.

The embodiments of the invention, in which an exclusive property or privilege is claimed, are defined as follows:

1. A method of combatting insects which comprises applying to said insects an insecticidal amount of a compound of the formula

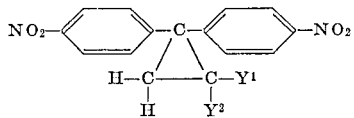

wherein $Y^1$ is selected from the group consisting of chlorine, bromine, fluorine and $Y^2$ is selected from the group consisting of chlorine and bromine provided that when $Y^1$ is fluorine $Y^2$ is chlorine.

2. A method in accordance with claim 1 wherein the compound is 1-(4-nitrophenyl)-1-(4'-nitrophenyl)-2,2-dichlorocyclopropane.

References Cited
UNITED STATES PATENTS 3,285,811  11/1966  Wiles _____ 424—354

OTHER REFERENCES

Chemical Abstracts 43: 9042h (1949).

JEROME D. GOLDBERG, Primary Examiner